United States Patent [19]

Hicks, Jr. et al.

[11] 4,174,143
[45] Nov. 13, 1979

[54] BUS DUCT JOINT EMPLOYING LIGHTLY-LOADED MULTIPLE-POINT ELECTRICAL CONNECTOR

[75] Inventors: Loy A. Hicks, Jr., Cedarburg; James J. Rusenko, Milwaukee, both of Wis.

[73] Assignee: Cutler-Hammer, Inc., Milwaukee, Wis.

[21] Appl. No.: 671,603

[22] Filed: Mar. 29, 1976

[51] Int. Cl.² .......................................... H01R 9/12
[52] U.S. Cl. ............................. 339/22 B; 339/92 M; 339/95 R
[58] Field of Search ................ 339/95 R, 92 R, 92 M, 339/22 R, 22 B, 24, 49 R

[56] References Cited

U.S. PATENT DOCUMENTS

| | | | |
|---|---|---|---|
| 2,217,433 | 10/1940 | Crabbs | 200/253 |
| 2,280,728 | 4/1942 | Streib | 339/256 |
| 3,180,924 | 4/1965 | Rowe | 339/22 B X |
| 3,453,587 | 7/1969 | Neidecker | 339/256 |
| 3,605,064 | 9/1971 | Routh et al. | 339/22 B X |
| 3,786,394 | 1/1974 | Koenig et al. | 339/22 |
| 3,845,451 | 10/1974 | Neidecker | 339/49 R |
| 3,861,595 | 1/1975 | Deal | 339/95 |
| 3,895,853 | 7/1975 | Neidecker | 339/272 |

OTHER PUBLICATIONS

Multilam—A New Concept in Interface Technology—Holm Seminar Paper, Illinois Inst. of Technology, Oct. 18, 1973.
Guide to Multilam Technology, Multilam Corporation, Los Angeles, Revision of Jan. 15, 1975, pp. 7a, 11.

Primary Examiner—Roy Lake
Assistant Examiner—E. F. Desmond
Attorney, Agent, or Firm—Hugh R. Rather; William A. Autio; Michael E. Taken

[57] ABSTRACT

A single-bolt joint having louvered contact strips interposed the bus bars and conductor splice plates for improved electrical connection under low insertion forces is tightened to become a solid connector assembly prior to attachment to the bus bars of a first bus duct and requires no additional tightening after insertion of the bus bars of the second bus duct. Expansion of the bus bars is accommodated at each joint without special apparatus.

15 Claims, 5 Drawing Figures

BUS DUCT JOINT EMPLOYING LIGHTLY-LOADED MULTIPLE-POINT ELECTRICAL CONNECTOR

BACKGROUND OF THE INVENTION

This invention relates to joint assemblies for electrical busway apparatus.

Electrical busway is utilized to conduct low voltage, high current power between a source and the controls for the ultimate load apparatus. A typical busway system includes a number of lengths of bus duct connected together end-to-end, each bus duct comprising a housing containing a plurality of bus bars and a connection joint at one end.

In present day busway systems, considerable emphasis has been placed on joint design to facilitate mechanical connection and provide good electrical connection. An exemplary busway joint is disclosed in U.S. Pat. No. 3,786,394, issued on Jan. 15, 1974 to Martin F. Koenig et al and assigned to the assignee of this application. As shown therein, a joint comprising a stacked assembly of insulators and electrical splice plates is disposed on the end of one length of bus duct such that pairs of splice plates are positioned on opposite surfaces of the respective bus bars and insulator plates are provided on the outer side of the assembly and between adjacent splice plates associated with different bus bars. A single, insulated bolt extends through the entire assembly, and loosely secures the joint to said one bus duct. Interfitting hook means are provided between the bus bars and splice plates to retain the joint to the bus duct even when loosely assembled. In installation, a second bus duct is inserted into the other side of the loose joint assembly such that the bus bars thereof are disposed between the respective pairs of splice plates. The connection is completed by tightening the bolt to compress all of the elements of the joint together, particularly the splice plates upon the opposite surfaces of the bus bars. To obtain the desired electrical conduction properties, such joints require compressive pressures which in turn require a torque to be applied to the bolt on the order of 75 foot pounds.

The present invention relates to an improvement in the above described busway joint. It provides a joint which is rigidly secured to the first bus duct at the point of manufacture to provide a rigid receptacle into which the second bus duct may be plugged-in during installation. This construction requires no subsequent tightening of the bolt by the installer. In addition, an enhanced electrical connection is provided.

SUMMARY OF THE INVENTION

It is an object of this invention to provide a joint assembly for an electrical bus duct, which joint assembly is securely clamped to one end of the bus duct during the manufacture thereof to provide a rigid plug-in receptacle for receiving a second bus duct upon installation.

It is a further object of this invention to provide a joint assembly of the aforementioned type which requires no compressive adjustment after installation with a second bus duct.

It is still a further object of this invention to provide a joint assembly of the aforementioned type which provides enhanced electrical conduction with only a fraction of the compressive force required in present day joint assemblies.

These and other objects and advantages of this invention will become apparent in the following specification and claims when read in conjunction with the accompanying drawings.

DESCRIPTION OF THE PREFERRED EMBODIMENT

Figure 1:
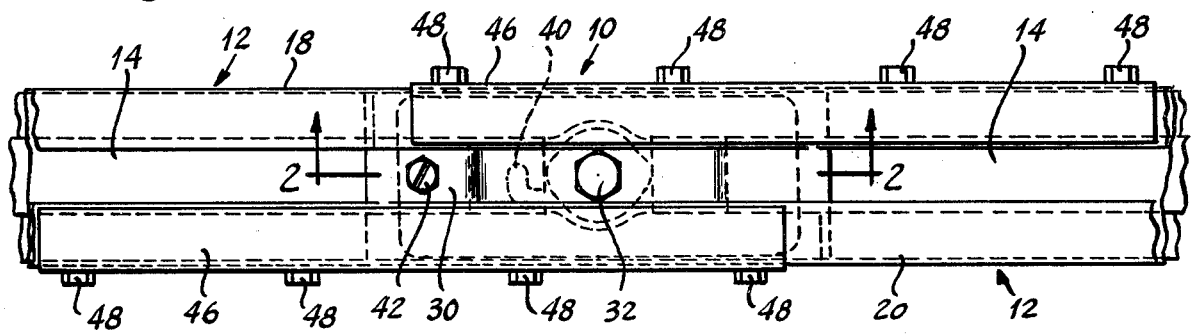
FIG. 1 is a top plan view of a single-bolt joint assembly of this invention shown connected between two bus duct sections.
Figure 2:
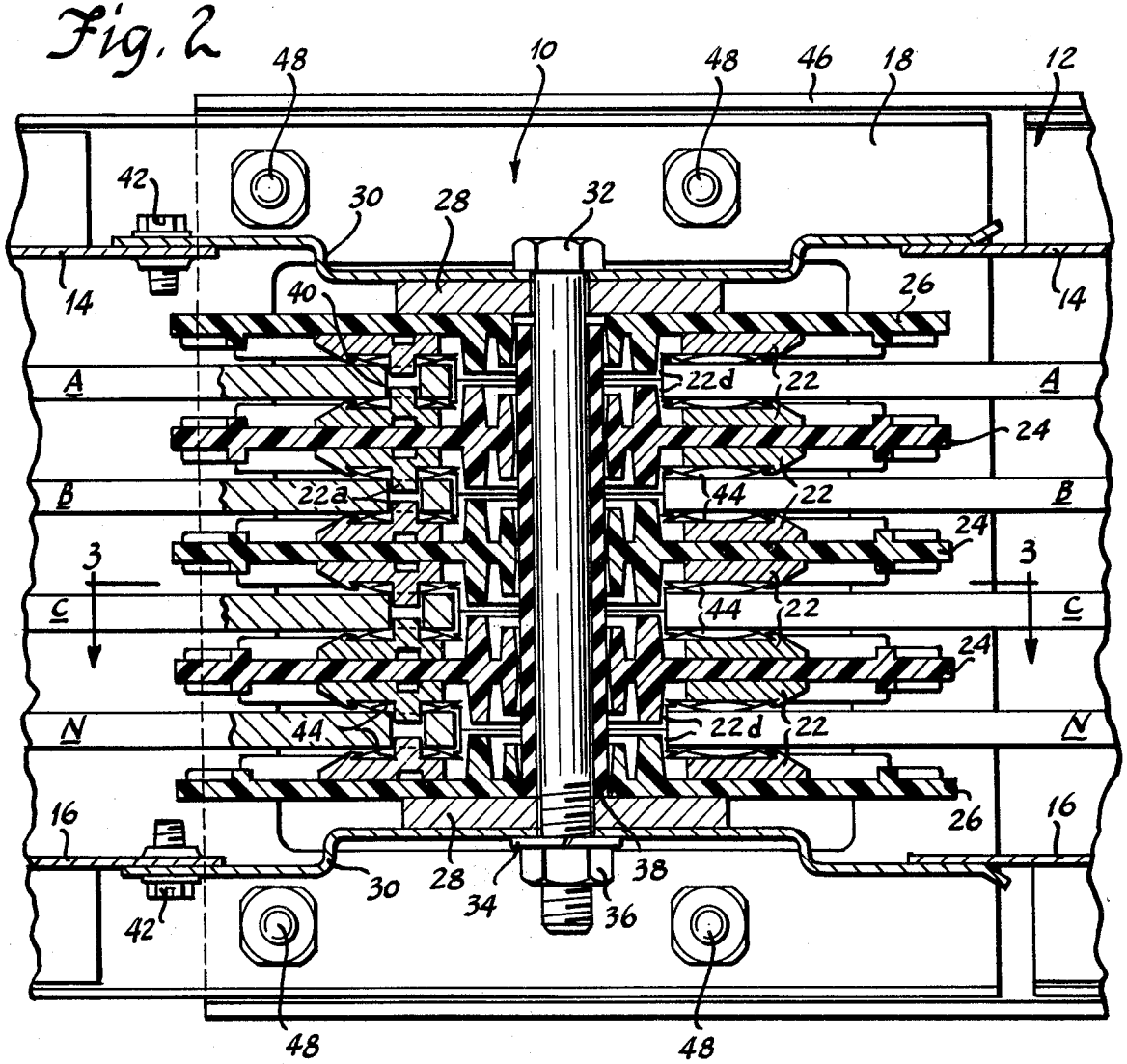
FIG. 2 is a longitudinal cross-sectional view of the joint assembly taken along line 2—2 of FIG. 1.

With reference to the drawings and particularly to FIGS. 1 and 2 thereof, the joint assembly 10 of this invention is shown assembled between two bus duct sections 12. Bus duct sections 12 are identically constructed, each comprising a plurality of flat, elongated bus bars, A, B, C and N disposed within a sheet metal housing comprising top and bottom members 14 and 16, respectively, and side members 18 and 20. The latter are identical members, but are staggered with respect to each other in assembly of the bus duct such that member 18 extends beyond the ends of the members 14 and 16 at the right-hand end of the bus duct while the member 20 similarly extends beyond the ends of members 14 and 16 at the left-hand end of the bus duct. The bus bars A, B, C and N also project beyond the opposite ends of members 14 and 16, but do not project beyond the extended end of the respective side member 18 or 20.

Joint assembly 10 electrically connects bus duct sections 12 together, joining corresponding bus bars of one section to the other; i.e., A to A, B to B, etc. The joint assembly 10 comprises a plurality of electrically conductive splice plates 22, intermediate and outer insulator plates 24 and 26, respectively, pressure distributing plates 28, and end plates 30, all arranged in a stack and held together by a bolt 32 which passes through aligned central apertures in each member and receives a lock washer 34 and hex nut 36 at its opposite end. Additionally, an insulating sleeve 38 is positioned over the shank of bolt 32 within the joint between the plates 28.

Figure 3:
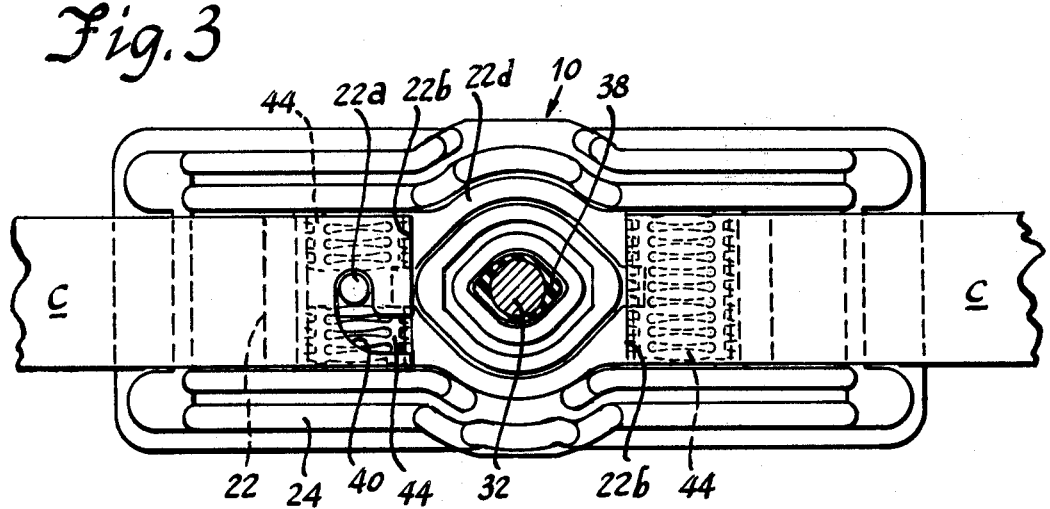
FIG. 3 is a cross-sectional view taken along line 3—3 in FIG. 2 showing the interconnection of the joint with one corresponding pair of bus bars.

In prior art busway joints, such as that disclosed in the aforementioned U.S. Pat. No. 3,786,394, the loosely assembled joint as described to this point would be assembled at the manufacturing plant to the end of a bus duct section. The cooperating pairs of splice plates 22 require careful initial alignment and spacing to position them on the opposite surfaces of their respective bus bars. As best seen in FIG. 3, the right-hand end of each bus bar is provided with a dog-leg slot 40 which receives cooperatively aligned raised bosses 22a formed on each splice plate 22 to mechanically interlock the splice plates to the bus bars. As a result, the entire joint assembly 10 is interlocked to the bus bars. The end plates 30 of joint 10 are secured to top and bottom housing members 14 and 16 by screws 42.

Having been assembled to the bus duct section as described above, the prior art joint is tightened to only finger-pressure compression until final installation. While this is a presently acceptable design, it does provide some dissadvantages with allignment in the initial assembly of the joint to the bus duct at the factory and in the installation of the section in the field. In the latter instance, the stack of splice plates and insulators must be checked to insure that they are sufficiently loose to enable the adjacent bus bars to be inserted, but are not so loose as to move out of position and block entry of the bus bars or become out of position in final assembly. A further dissadvantage is the requirement for tightening the joint bolt subsequent to insertion of the second bus duct. In order to obtain the desired electrical conduction properties between flat-surfaced bus bars and splice plates it is necessary to provide substantially high compressive forces. Thus the installer must tighten the bolt to the recommended torque, customarily 75 foot-pounds, when the two bus duct sections are installed in their final location. Apart from requiring special tools, the nature of such final location often renders this step difficult to accomplish.

The joint assembly 10 of this invention eliminates each of the aforementioned disadvantages in that it provides a joint which may be tightened to a final torque before attaching it to either bus duct. In so doing, all of the splice plates, insulators and other elements of the joint assembly are secured firmly together and in position, thereby requiring no separate individual spacing to align with the bus bars and housing during assembly. The slots 40 cooperate with bosses 22a and screws 42 secure the end plates 30 to the bus duct housing as before to mechanically secure the joint 10 on the bus duct. A second duct is electrically connected to the joint 10 solely by insertion thereinto, final mechanical connection being accomplished by the normal housing cover plates for the joint as will be described in detail hereinafter.

To overcome the aforementioned disadvantages, the splice plates 22 of the improved joint assembly 10 are provided with inset louvered contact strips 44 such as that shown and described in U.S. Pat. No. 3,453,587 issued on July 1, 1969 to R. Neidecker. These strips 44 are formed from a material having good electrical conductive and mechanical spring qualitites and a relatively thin cross-sectional thickness. The strips 44 are formed to have a multiplicity of curved louvers bent obliquely to the plane of the strip and extending transversely thereof. By example, strips 44 may preferrably be formed of 0.008 inch beryllium brass.

Figure 4:
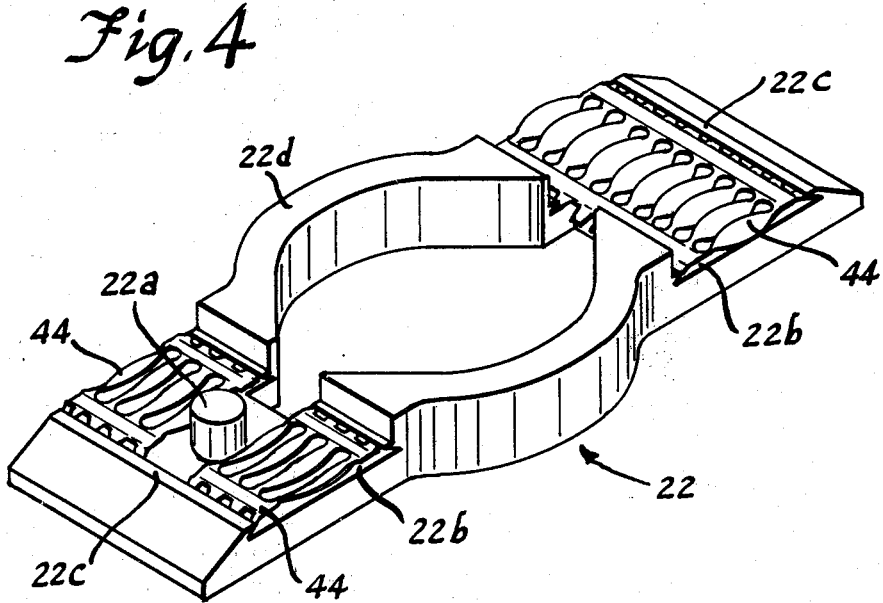
FIG. 4 is an isometric view of an electrically conductive splice plate used in the joint assembly of FIGS. 1—3.

As seen most clearly in FIG. 4, splice plates 22 are provided with dovetail grooves 22b in the front face 22c at each end thereof. Louvered contact strips 44 are inserted into grooves 22b, the strips 44 having downwardly offset tabs formed along the edges thereof for retention within the grooves 22b. The corners of grooves 22b may be upset with a hand punch or by a similar staking operation at the opposite edges of the plate 22 to prevent the strips 44 from being removed or falling out. It should also be noted that the presence of the raised boss 22a within one of the grooves 22b requires two separate strips 44 to be inserted in that groove, one from each side of the plate.

Figure 5:
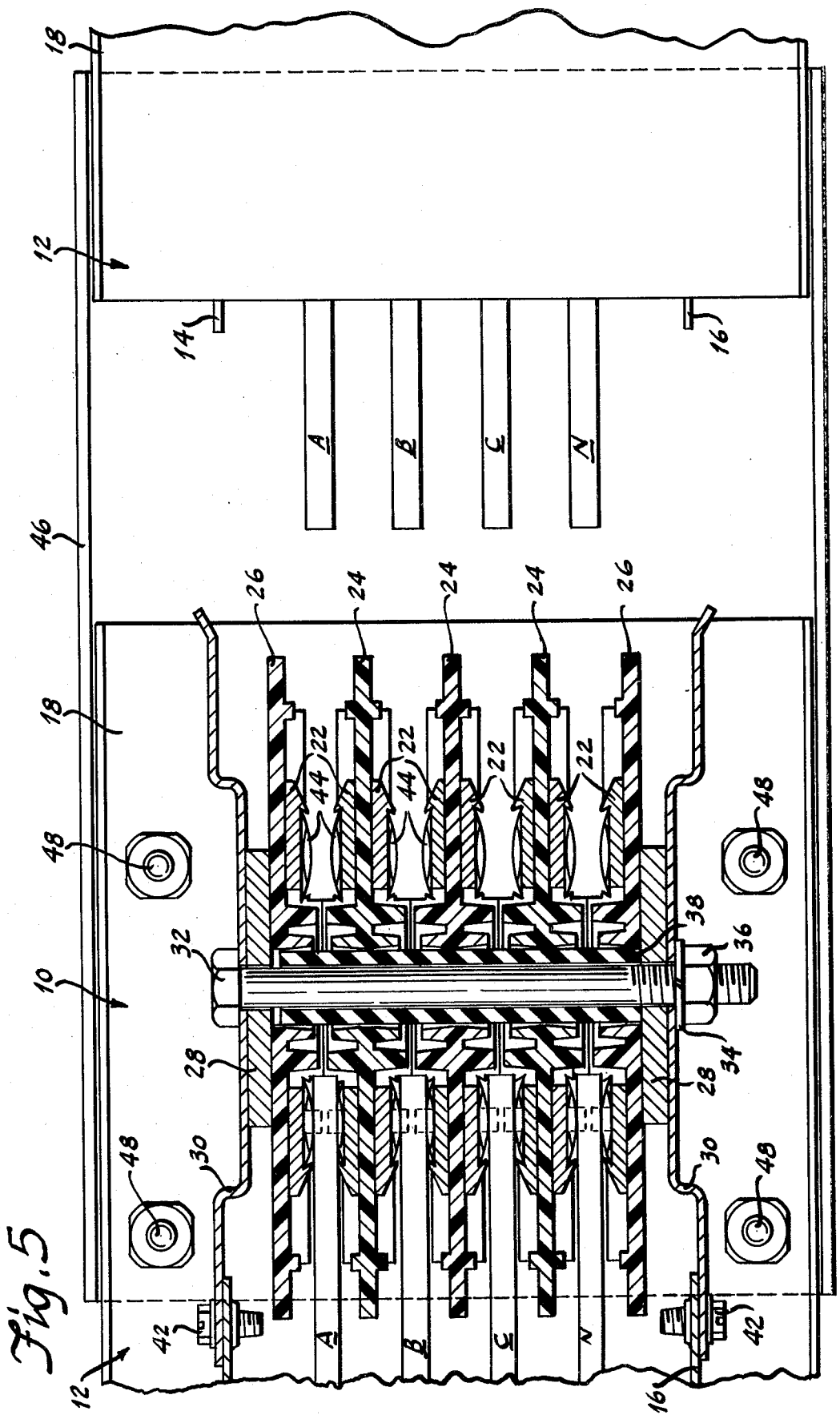
FIG. 5 is a longitudinal cross-sectional view similar to FIG. 2 but showing the right-hand bus duct section in a position to be inserted into the joint assembly.

Splice plates 22 further have a raised rib portion 22d surrounding the central aperture. The height of rib 22d is tolerance controlled with respect to the front face 22c. As seen in FIGS. 2 and 5, the splice plates 22 are arranged in mirror image relationship to each other in cooperative pairs for each bus bar, with the outer surfaces of ribs 22d in mating engagement. Accordingly a space is provided between the cooperating faces 22c of adjacent splice plates which is twice the height of the rib 22d above the face 22c and which is dimensionally stable within controlled tolerances.

The louvers of contact strips 44 project beyond the respective faces 22c of the splice plates 22 to extend into the space between cooperating pairs of said plates. The bus bar thickness and overall dimension of the aforementioned space as determined by the height of ribs 22d are selected to provide a predetermined deflection of the louvers upon insertion of a bus bar thereinto. When a bus bar is received in the space between cooperating splice plates, each louver engages the surface of the bus bar along one edge and the bottom surface of the groove 22b of the respective splice plate 22 along the other edge thereof, thereby providing individual electrical connections between the bus bar and splice plates at each louver. The spring pressure required for each such connection is extremely light, particularly as compared to the compressive force required in flat surface connections, and is provided by the deflection of the individual louvers.

In assembly of the joint 10, the bolt 32 and hex nut 36 are firmly tightened to the final torque on the order of 15 foot-pounds, to compress the stack of splice plates 22, insulator plates 24 and 26, pressure plates 28 and end plates 30 solidly together, such that none of the individual members are free to move in any direction. The solid joint assembly 10 is thereafter plugged onto the end of an assembled bus duct section 12 by a sequential longitudinal and transverse movement in order to engage the dog-leg slots 40 with bosses 22a. End plates 30 are secured to the top and bottom members 14 and 16 with screws 42.

In installation, the bus duct section 12 with joint assembly 10 affixed thereto is normally secured in position and a second section 12 is then brought into position in alignment therewith. This condition is depicted in FIG. 5. The second section 12, shown on the right in the drawings, is then completely electrically connected to the first bus duct section and joint 10 solely by inserting the bus bars into the spaces between the cooperating splice plates 22. This is accomplished with very light force since the only forces necessary to be overcome are the deflective resistance of the individual louvers on contact strips 44. The depth of insertion is controlled by the engagement of the leading edges of the bus bars with the upstanding ribs 22d. When inserted, the connection comprises a multiplicity of individual electrical connections, one for each louver.

After electrically connecting the two bus duct sections 12 together with the joint assembly 10, a mechanical connection between the members is effected through the attachment of sheet metal cover plates 46 to the sides 18 and 20 of the bus duct housing. Cover plates 46 overlap the gap between the ends of the side members of the respective sections 12 and are secured by bolts 48. This mechanical connection prohibits the sections from being pulled apart.

The ability of joint assembly 10 to maintain electrical connection without rigidly clamping the bus bars and splice plates together affords another advantage, that of permitting expansion and contraction of the bus bars at each joint assembly. The heat generated by current passing through the bus bars causes such expansion. The exact amount of expansive movement is not large per section, but in systems employing rigidly clamped joints, the lineal expansion components become accummulative, often resulting in a tearing of the bus bar surfaces. In the joint assembly of this invention, each joint affords lineal expansive movement of the bus bars, thereby eliminating any damage due to the accumulative effect over several sections. Moreover, it is envisaged that expansion designs could be provided that would permit several inches of movement between adjacent bus bars utilizing the similar construction technology employed in the joint assembly 10.

While the apparatus hereinbefore described is effectively adapted to fulfill the objects stated, it is to be understood that the invention is not intended to be confined to the particular embodiment of bus duct joint assembly disclosed, inasmuch as it is susceptible of various modifications without departing from the scope of the appended claims.

We claim:

1. A joint assembly for electrically interconnecting a plurality of first and second bus bar pairs, said first and second bus bar pairs being longitudinally aligned and spaced in end-to-end relation, said pairs of bus bars being transversely spaced at their ends, said joint assembly comprising:

pairs of electrically conductive plates disposed along opposite surfaces of said pairs of bus bars bridging the space between the ends of the respective longitudinally aligned first and second bus bars, said plates each having a groove formed at the opposite ends thereof in the surface adjacent a respective bus bar;

electrically conductive strips inset in said grooves, said strips having a plurality of resilient louvered contact portions formed to project obliquely out of the plane of said strip, the opposite edges of said louvered contact portions engaging said conductive plate and said bus bar, respectively, for electrical connection therebetween; and means joining said pairs of electrically conductive plates together as an assembly and connecting said assembly with the ends of said plates transversely spaced a predetermined distance to the ends of said plurality of said first bus bars to form a solid joint assembly therewith wherein one end of the respective conductive plates electrically engages said bus bar, the opposite ends of said pairs of conductive plates being fixed at a predetermined spaced distance from each other to provide a predetermined deflection of said louvered contact portions by said second bus bar, and said pairs of said conductive plates being transversely spaced and aligned with said second bus bars to receive the latter in sliding engagement.

2. A joint assembly for electrically interconnecting a plurality of correspondingly aligned, longitudinally spaced first and second bus bars, said bus bars being transversely aligned and spaced at their ends, said joint assembly comprising:

a plurality of pairs of electrically conductive plates disposed along opposite surfaces of said bus bars and bridging the space between said bus bars, each plate having a groove formed at the opposite ends thereof in the surface adjacent said bus bar;

electrically conductive strips inset in said grooves, said strips having a plurality of resilient louvered contact portions formed to project obliquely out of the plane of said strip, the opposite edges of said louvered contact portions engaging said conductive plate and said bus bar, respectively, for electrical connection therebetween;

means fixing said pairs of electrically conductive plates at a predetermined spaced distance from each other to provide a predetermined deflection of said louvered contact portions by said bus bars; and means for fixing said plurality of pairs of plates at predetermined transversely spaced intervals for cooperative alignment with respective ones of said plurality of bus bars, said means for fixing said plurality of pairs of plates at predetermined transversely spaced intervals including insulator means electrically insulating adjacent ones of said pairs of conductive plates.

3. The combination according to claim 2 wherein said joint assembly is rigidly secured as a solid unit and is slidably engageable with said bus bars.

4. In combination, a first and second bus duct each having a plurality of bus bars and a joint assembly electrically interconnecting the individual bus bars of said first bus duct to corresponding ones of said bus bars of said second bus duct, said joint assembly comprising: a plurality of electrically conductive members correspondingly aligned with said bus bars, insulating means disposed between ones of said electrically conductive members associated with adjacent bus bars, and means securing said electrically conductive members and said insulating means rigidly together to form a solid joint assembly independent of connection thereof to the bus bars of either of said first or second bus ducts.

5. The combination according to claim 4 wherein said solid joint assembly is slidably engageable with the bus bars of said first and second bus duct for fully accomplishing the electrical connection therebetween.

6. The combination according to claim 4 wherein said plurality of electrically conductive members are flat plate members each having a pair of spaced grooves in the surface adjacent said bus bars, and electrically conductive strips inset in said grooves, said strips having a plurality of louvered contact portions formed therein to extend obliquely out of the plane of said strips, the opposite edges of said louvered contact portions engaging said plate member and said bus bar, respectively, for electrical connection therebetween.

7. A joint assembly for electrically interconnecting the corresponding individual bus bars of a first and second bus duct, said joint assembly comprising, in combination:

a plurality of cooperating pairs of electrically conductive splice plates having their opposite ends spaced apart to receive the ends of said bus bars therebetween;

insulating means interposed adjacent pairs of said splice plates and adjacent the outer surface of the outermost splice plates;

means securing said splice plates and said insulator plates rigidly together to provide a solid joint assembly;

electrically conductive strips inset in the opposed faces of said splice plates, said strips having a plurality of resilient contact portions projecting obliquely out of the plane of said strip, the opposite edges of said contact portions engaging the surface of said splice plate and of a bus bar inserted therein to provide electrical connection therebetween; and wherein said solid joint assembly is electrically connected to said first and second bus ducts solely by inserting the bus bars thereof into the spaces provided by said cooperating pairs of splice plates.

8. The combination according to claim 7 wherein said resilient contact portions are louvers extending longitudinally of said bus bar.

9. The combination according to claim 8 wherein said splice plates each comprise an upstanding portion intermediate the ends, and said splice plates are arranged in facing pairs such that said upstanding portions are in mutual engagement to provide the spacing for the ends of said plates.

10. The combination according to claim 9 wherein said splice plates and said insulator means are provided with centrally located apertures, and said means securing said splice plates and said insulator plates together comprises bolt means extending through said apertures.

11. An electrical connector assembly comprising: a first rigid electrical conductor means and a second rigid electrical conductor means spaced from said first conductor means; an electrical connector unit having a number of rigid, electrically conducting plates; means mounting the plates of said connector unit in an operative position with said plates being spaced apart and in bridging relationship to said first conductor means and said second conductor means to electrically interconnect said first conductor means and said second conductor means, at least one of the conductor means being movable relative to the plates of said connector unit when the latter is in said operative position to compensate for temperature cycling, each plate having a pair of opposed, outer faces with at least one face provided with a pair of spaced grooves therein aligned with a corresponding conductor means when the connector unit is in said operative position; and a louvered electrical connector device for each groove, respectively, each device being disposed within the corresponding groove and having a plurality of spaced, angled, resiliently mounted fins with each fin having a pair of opposed, outer curved edges in engagement with the adjacent plate and conductor means, respectively, when the connector unit is in said operative position whereby the first conductor means and the second conductor means are electrically connected to each other through the devices and said plates of said unit.

12. An assembly as set forth in claim 11, wherein the grooves in each plate extend transversely of the corresponding conductor means.

13. An electrical connector unit for first and second groups of elongated, rigid electrical conductors with a conductor of one group being longitudinally aligned with and spaced from a respective conductor of the other group, said unit including at least a number of rigid electrically conducting plates with each plate having a face provided with a pair of spaced grooves and with each groove aligned with a corresponding conductor; a louvered electrical connector device for each groove, respectively, each device being disposed within the corresponding groove and having a plurality of spaced, angled, resiliently mounted fins with each fin having a pair of opposed, outer curved edges in engagement with the adjacent plate and adapted to engage the corresponding conductor when the unit is in an operative position with said plates bridging the distance between respective conductors of said first and second groups, whereby the conductors are electrically connected to each other through the devices and said plates; and means coupled to the plates for mounting the same in spaced relationship for attachment on at least one group of conductors with the plates having lengths sufficient to bridge the gap between the first and second groups of conductors and with the ends of the plates being proximal to and overlapping respective groups of conductors, the plates of said unit being shiftable relative to the conductors of at least one of the groups when the unit is in said operative position to compensate for temperature cycling.

14. An assembly as set forth in claim 13, wherein the grooves in each plate extend transversely of the corresponding conductors.

15. An assembly as set forth in claim 13, wherein said mounting means includes a clamp.

* * * * *